United States Patent Office 2,785,134
Patented Mar. 12, 1957

2,785,134

METHOD OF PREPARING DRY CLEANING COMPOSITIONS

Martin B. Mathews, Chicago, and Charles E. Stauffer, River Forest, Ill., assignors to R. R. Street & Co., Inc., Chicago, Ill., a corporation of Illinois No Drawing. Application October 29, 1952, Serial No. 317,572

6 Claims. (Cl. 252—161)

Our invention relates to the dry cleaning field and is particularly concerned with new and improved methods of simply and directly producing compositions containing, as essential ingredients thereof, petroleum hydrocarbon fractions having an initial foiling point not substantially below 200 degrees C. in which are dissolved certain oil-soluble diesters of sulfosuccinic acid, said compositions being substantially free of inorganic salts and, preferably, also being substantially free from water as prepared.

The compositions of matter which are prepared in accordance with our present invention are highly useful as dry cleaning detergents and dry cleaning emulsifying agents and are adapted to be admixed with hydrocarbons, chlorinated hydrocarbons, and other organic solvents. They are highly effective in the production of emulsions wherein the external phase is an organic water-insoluble liquid, the internal phase being water or aqueous material or other liquids which are insoluble in the organic phase. In order to be fully effective for use in the dry cleaning field, it is important that such compositions be substantially free of inorganic salts, generally below about 0.1% by weight, and it is also highly desirable, at least in most cases, that, as prepared, they be substantially free of water.

Oil-soluble diesters of sulfosuccinic acid are, per se, not new and no novelty is, of course, claimed therein. Moreover, they have heretofore been disclosed for use in dry cleaning liquid organic solvents as well as in conjunction with paraffin oils or paraffin hydrocarbons. Said esters have heretofore been prepared, for example, by reacting a maleic acid alcohol diester, for example, dicaprylmaleate, with sodium bisulfite in an aqueous medium. The resulting reaction mixture is then dried and, where it is desired that said mixture be free of inorganic salts, this has been accomplished by dissolving the reaction mixture in an organic solvent such as benzene, filtering, and evaporating the benzene. This procedure is a costly and cumbersome one in that it requires, among other things, the preliminary drying of the reaction mixture and this, in itself, presents a number of difficulties because various of the sulfosuccinic acid diesters are of a gummy nature and present serious problems with respect to the handling and drying thereof.

In accordance with our invention, compositions having marked efficacy in the dry cleaning field, which compositions contain a petroleum hydrocarbon fraction having an initial boiling point not substantially below 200 degrees C., in which are dissolved certain oil-soluble diesters of sulfosuccinic acid, are prepared in such a manner as to offer marked advantages over earlier methods heretofore suggested. As indicated, the compositions are directly prepared in a form wherein they are readily adapted for use in the dry cleaning field and form highly useful dry cleaning compositions. When added in small amounts to dry cleaning water-immiscible organic solvents, such as naphtha, Stoddard solvent, carbon tetrachloride, trichlorethylene, benzene, gasoline, and the like, they enable substantial amounts of water to be taken up by the organic solvents and largely retain such water during the dry cleaning operation, the water being so finely dispersed in the organic solvent that the clarity of the latter is not visibly affected.

In the practice of our invention, the inorganic salts and moisture are removed after the reaction is essentially completed without requiring the handling of the product in the form of a solid or semi-solid gummy mass and without requiring expensive drying operations followed by extraction with organic solvents. By proceeding in accordance with our invention, these latter expensive and cumbersome steps are avoided and, at the same time, reduction of the inorganic salt content in the final product to the desired degree is readily effected in an inexpensive and simple manner.

In the practice of our invention, the alcohol diester of maleic acid, for example, dioctylmaleate, is reacted with an alkali bisulfite, particularly sodium bisulfite, in the presence of water and in the additional presence of a petroleum hydrocarbon fraction having an initial boiling point, at atmospheric pressure, not substantially below 200 degrees C., such fraction being exemplified by a mineral oil having an initial boiling point of the order of 200 to 220 degrees C. or more. In general, we prefer to utilize petroleum fractions having a boiling point range, at atmospheric pressure, between about 200 and 400 degrees C. or, still more preferably, between about 260 and 350 degrees C. The mixture is reacted, under conditions of agitation, at somewhat elevated temperatures, usually of the order of 95 degrees C. to somewhat in excess of 100 degrees C. until the reaction is essentially completed, that is, the production of the sulfosuccinic acid diester is achieved. This usually takes at least several hours. It is preferred to carry out the reaction at atmospheric pressure but, if desired, the reaction can be performed at greater pressures in which event the reaction conditions may be somewhat modified. The mineral oil serves, among other things, to maintain the reaction mixture in a state where it can be handled as a liquid, particularly toward the end of the reaction where, if it were not present, a gummy reaction mixture would result which could not be stirred or satisfactorily handled.

At the completion of the reaction, there is then particularly advantageously added to the reaction mixture a further quantity of a mineral oil or similar petroleum fraction having an initial boiling point not substantially below 200 degrees C. and, in addition, it is especially desirable to add a volatile organic solvent which is distillable together with water to assist in the subsequent elimination of water from the mixture. Typical examples of such latter agents are carbon tetrachloride, trichlorethylene, benzene, perchlorethylene, and toluene. The mixture is then heated to distill therefrom water and the added volatile organic solvent. In the usual case, the temperature to which the mixture is heated to effect removal of water and organic solvent will fall within the range of about 175 to about 190 degrees C. Thereafter, to the residual mass it is particularly desirable to add a petroleum fraction having an initial boiling point not substantially below 200 degrees C., for example, a mineral oil, or a volatile organic solvent such as Stoddard solvent, trichlorethylene or benzene or the like, after which the mixture is cooled and filtered. The final product is a clear solution, substantially free of inorganic salts and of moisture, and contains a substantial proportion of the diester of sulfosuccinic acid, for example, sodium diotcyl sulfosuccinate. In the usual case, we find it particularly satisfactory to produce compositions containing about 40% to about 65%, preferably about 55% to 60%, by weight, of the diester of sulfosuccinic acid in the mineral oil or like or other petroleum hydrocarbon fraction.

For effective use in the dry cleaning industry, in connection with the production of oil-soluble detergents and for the formation of water-in-oil emulsions, the aliphatic alcohol radical of the sulfosuccinic acid esters should contain from 6 to about 10 carbon atoms. Typical examples of such alcohols are, therefore, n-hexyl alcohol, isohexyl alcohol, n-heptyl alcohol, n-octyl alcohol, 2-ethylhexyl alcohol, mixtures of dimethyl hexanols, n-nonyl alcohol, isononyl alcohol, isomeric nonyl alcohols, and decyl alcohol. It will be understood that mixtures of such alcohols or mixtures of aliphatic alcohols predominating in those having a carbon content of from 6 to 10 carbon atoms can also effectively be utilized. Those of the esters which are utilized in accordance with the present invention are, as pointed out above, the sulfosuccinic acid esters in which both carboxyl groups of the succinic acid are esterified with aliphatic alcohols. While, in the usual case, both carboxyl groups will be esterified with the same alcohol or alcohols, it will be understood that the production of compositions within the scope of our invention may, however, comprise such mixed esters wherein one of the carboxyl groups may be esterified with, for example, one aliphatic alcohol such as hexyl alcohol, and the other of the carboxyl groups may be esterified with another aliphatic alcohol such as octyl alcohol.

The following examples are illustrative of the practice of our invention. It will be understood that these examples are not to be construed in any way as limitative of the full scope of our invention since different aliphatic alcohols can be utilized, the proportions of the ingredients can be varied, the reaction temperatures and times are likewise variable, within limits, and other modifications can be made, all within the spirit and guiding principles of the teachings herein. All parts stated are by weight.

*Example 1*

291 parts of dioctyl maleate, prepared by esterification of maleic anhydride with 2-ethylhexanol, is admixed with 24 parts mineral oil (initial B. P. 225 degrees C.), 90 parts water and 90 parts sodium bisulfite, and the mixture is heated, with agitation, at about 98 to 100 degrees C. for about 24 hours whereby sodium dioctyl sulfosuccinate is produced in the reaction mixture. Then 80 additional parts of mineral oil and 80 parts of perchlorethylene are added and the mixture is heated and allowed to distill until the temperature of the mixture reaches about 185 degrees C. (Approximately 75 parts of water and about 75 parts of perchlorethylene are recovered in the distillate.) To the residual mass 100 additional parts of mineral oil is added and, after cooling to room temperature or somewhat thereabove, the mixture is filtered whereupon a clear composition is obtained containing about 60%, by weight, of sodium dioctyl sulfosuccinate, said composition being substantially free of inorganic salts and water.

*Example 2*

340 parts of dinonyl maleate, prepared by esterification of maleic anhydride with n-nonyl alcohol, is admixed with 35 parts mineral oil (initial B. P. 245 degrees C.), 110 parts of water and 110 parts of sodium bisulfite, and the mixture is heated, with agitation, at about 100 degrees C. for about 20 hours. Then 95 additional parts of mineral oil and 95 parts of perchlorethylene are added and the mixture is heated and allowed to distill until the temperature of the mixture reaches 190 degrees C. To the residual mass, 110 additional parts of mineral oil is added and, after cooling to about room temperature, the mixture is filtered whereupon a clear composition is obtained containing a high percentage of sodium dinonyl sulfosuccinate, said composition being substantially free of inorganic salts and water.

The proportions of ingredients utilized are subject to variation, as has been indicated above. A good working range, for instance, considered, by way of illustration, in relation to Example 1, comprises, based on the use of 291 parts of dioctyl maleate, from about 20 to about 30 parts of mineral oil, from about 80 to about 100 parts of water, and from about 80 to about 100 parts of sodium bisulfite in the reaction proper to produce the diester of sulfosuccinic acid. A good average reaction temperature is from about 95 to about 100 degrees C. and a good average reaction time is from several hours to about 24 hours. The amount of mineral oil or the like which is added initially after the completion of said reaction is from about 70 to about 100 parts and the amount of volatile organic solvent, such as perchlorethylene, utilized will ordinarily vary from about 50 to about 150 parts. These illustrative figures will serve as guides to enable those versed in the art readily to select suitable operating conditions and proportions of ingredients effectively to carry out the teachings of our invention.

What we claim as new and desire to protect by Letters Patent of the United States is:

1. A method of preparing a dry cleaning composition which comprises reacting, under agitation, an aliphatic alcohol diester of maleic acid, the aliphatic alcohol radical of which contains from 6 to about 10 carbon atoms, with an alkali bisulfite in aqueous solution and in a mineral oil having an initial boiling point not substantially below 200 degrees C., said diester of maleic acid and said alkali bisulfite being present in proportions to produce the alkali salt of the sulfosuccinic acid ester of said alcohol, said mineral oil being present in amounts sufficient to maintain the reaction medium in a liquid condition throughout said reaction, at the end of said reaction adding to the reaction mixture a liquid volatile organic solvent which is distillable together with water at a temperature below 190 degrees C., then heating the mixture to remove the water and at least most of the last-mentioned liquid volatile organic solvent but not said mineral oil, and filtering whereby to obtain a liquid composition substantially free of inorganic salts.

2. A method of preparing a dry cleaning composition which comprises reacting, under agitation, an aliphatic alcohol diester of maleic acid, the aliphatic alcohol radial of which contains from 6 to about 10 carbon atoms, with an alkali bisulfite in aqueous solution and in a mineral oil having an initial boiling point not substantially below 200 degrees C., said diester of maleic acid and said alkali bisulfite being present in proportions to produce the alkali salt of the sulfosuccinic acid ester of said alcohol, said mineral oil being present in amounts sufficient to maintain the reaction medium in a liquid condition throughout said reaction, at the end of the reaction adding to the reaction mixture an additional amount of a mineral oil having an initial boiling point not substantially below 200 degrees C. and also adding a liquid volatile organic solvent which is distillable together with water at a temperature below 190 degrees C., then heating the mixture to remove the water and at least most of the last-mentioned liquid volatile organic solvent but not said previously mentioned mineral oil, cooling the residual product, adding thereto a further amount of a liquid organic solvent, and then filtering whereby to obtain a liquid composition substantially free of inorganic salts.

3. A method of preparing a dry cleaning composition which comprises reacting, under agitation, an aliphatic alcohol diester of maleic acid, the aliphatic alcohol radical of which contains from 6 to about 10 carbon atoms, with sodium bisulfite in aqueous solution and in a mineral oil having a boiling point between about 260 and 350 degrees C., said diester of maleic acid and said alkali bisulfite being present in proportions to produce the alkali salt of the sulfosuccinic acid ester of said alcohol, said mineral oil being present in amounts sufficient to maintain the reaction medium in a liquid condition throughout said reaction, at the end of said reaction adding to the reaction mixture an additional amount of a mineral oil having a boiling point between about 260 and 350 degrees C. and also adding a liquid volatile organic solvent which is distillable together with water at a temperature below 190 degrees C., then heating the mixture to remove the water and at least most of the last-mentioned liquid volatile organic solvent but not said previously mentioned mineral oil, cooling the residual product, adding thereto a mineral oil having an initial boiling point not substantially below 200 degrees C., and then filtering whereby to obtain a liquid composition substantially free of inorganic salts.

4. A method of preparing a dry cleaning composition which comprises reacting, under agitation and at a temperature in the range of about 95 to about 100 degrees C., one mol of an aliphatic alcohol diester of maleic acid, the aliphatic alcohol radical of which contains from 6 to about 10 carbon atoms, with from about 0.5 mol to about 1 mol of sodium bisulfite in aqueous solution and in a minor amount of a mineral oil having a boiling point range between about 200 and 400 degrees C., said diester of maleic acid and said sodium bisulfite being present in proportions to produce the sodium salt of the sulfosuccinic acid ester of said alcohol, said minor amount of mineral oil being sufficient to maintain the reaction medium in a liquid condition throughout said reaction, at the end of said reaction adding to the reaction mixture a further and greater amount of a mineral oil having a boiling point range between about 200 and 400 degrees C. and also adding a liquid volatile organic solvent which is distillable together with water at a temperature below 190 degrees C., then heating the mixture to remove the water and at least most of the last-mentioned liquid volatile organic solvent but not said previously mentioned mineral oil, cooling the residual product, adding thereto a further amount of a mineral oil having a boiling point range between about 200 and 400 degrees C. and then filtering whereby to obtain a liquid composition substantially free of inorganic salts.

5. A method of preparing a dry cleaning composition which comprises reacting, under agitation, an aliphatic alcohol diester of maleic acid, the aliphatic alcohol radical of which contains from 6 to about 10 carbon atoms, with an alkali bisulfite in aqueous solution and in a mineral oil having an initial boiling point not substantially below 200 degrees C., said diester of maleic acid and said alkali bisulfite being present in proportions to produce the alkali salt of the sulfosuccinic acid ester of said alcohol, said mineral oil being present in amounts sufficient to maintain the reaction medium in a liquid condition throughout said reaction, at the end of said reaction adding to the reaction mixture a liquid volatile organic solvent which is distillable together with water at a temperature below 190 degrees C., then heating the mixture to remove the water and at least most of the last-mentioned liquid volatile organic solvent but not said mineral oil, cooling the residual product, adding thereto a further amount of a mineral oil having an initial boiling point not substantially below 200 degrees C., and then filtering whereby to obtain a liquid composition substantially free of inorganic salts.

6. A method of preparing a dry cleaning composition which comprises reacting, under agitation, 291 parts of dioctyl maleate with from 80 to 100 parts of sodium bisulfite in aqueous solution and 20 to 30 parts of a mineral oil having a boiling point between about 260 and 350 degrees C., at a temperature between about 96 and about 100 degrees C. for at least several hours, to produce the sodium salt of the sulfosuccinic acid diester of octyl alcohol, said reaction medium being in a liquid condition throughout said reaction, at the end of said reaction adding 70 to 100 parts of a mineral oil having a boiling point between about 260 and 350 degrees C. and 50 to 150 parts of perchlorethylene and heating the mixture to distill it until the temperature reaches about 175 to about 190 degrees C., whereby to remove the water and at least most of the perchlorethylene, then adding about 60 to about 120 parts of a mineral oil having an initial boiling point not substantially below 200 degrees C., cooling and filtering whereby to obtain a liquid composition substantially free of inorganic salts, all of the aforesaid parts being by weight.

References Cited in the file of this patent
UNITED STATES PATENTS 2,028,091    Jaeger    Jan. 14, 1936
2,327,183    Flett    Aug. 17, 1943